US010830094B2

United States Patent
Forcier et al.

(10) Patent No.: US 10,830,094 B2
(45) Date of Patent: Nov. 10, 2020

(54) GAS TURBINE ENGINE WITH GRAPHENE HEAT PIPE

(71) Applicant: United Technologies Corporation, Farmington, CT (US)

(72) Inventors: Matthew P. Forcier, South Windsor, CT (US); Joseph B. Staubach, Colchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 806 days.

(21) Appl. No.: 15/278,612

(22) Filed: Sep. 28, 2016

(65) Prior Publication Data

US 2018/0087398 A1   Mar. 29, 2018

(51) Int. Cl.
| | |
|---|---|
| *F01D 25/12* | (2006.01) |
| *F28F 21/02* | (2006.01) |
| *F28D 15/04* | (2006.01) |
| *F01D 5/08* | (2006.01) |
| *F28D 15/02* | (2006.01) |
| *F28D 21/00* | (2006.01) |
| *F02C 7/08* | (2006.01) |

(52) U.S. Cl.
CPC ............... *F01D 25/12* (2013.01); *F01D 5/08* (2013.01); *F28D 15/02* (2013.01); *F28D 15/046* (2013.01); *F28F 21/02* (2013.01); *F02C 7/08* (2013.01); *F05D 2220/36* (2013.01); *F05D 2260/208* (2013.01); *F28D 2021/0026* (2013.01); *Y02T 50/60* (2013.01)

(58) Field of Classification Search
CPC . F01D 25/12; F01D 5/08; F01D 5/186; F01D 5/187; F28D 15/00; F28D 15/02; F28D 15/046; F28D 2021/0026; F02C 7/08; F02C 7/12; F02C 7/14; F02C 7/16; F02C 7/18; F05D 2220/36; F05D 2260/208; F28F 21/02; Y02T 50/671; Y02T 50/676
USPC ............................................... 60/806
See application file for complete search history.

(56) References Cited

U.S. PATENT DOCUMENTS

| | | | |
|---|---|---|---|
| 2007/0053168 A1 | 3/2007 | Sayir | |
| 2008/0170982 A1* | 7/2008 | Zhang | .................... B82Y 10/00 423/447.3 |

(Continued)

FOREIGN PATENT DOCUMENTS

| | | |
|---|---|---|
| CN | 203964740 | 11/2014 |
| FR | 2915520 | 10/2008 |

(Continued)

OTHER PUBLICATIONS

Sattler, Klaus D.. (2011). Handbook of Nanophysics, 7 vol. Set—12.5 Carbon Nanotube Transistors. Taylor & Francis. (Year: 2011).*

(Continued)

*Primary Examiner* — Jesse S Bogue
*Assistant Examiner* — Loren C Edwards
(74) *Attorney, Agent, or Firm* — Cantor Colburn LLP

(57) ABSTRACT

A graphene heat pipe for a gas turbine engine includes a body of graphene. The body has a hot side to accept heat from the gas turbine engine, a cold side to reject heat from the body, and an adiabatic portion to flow heat within the body between the hot side and the cold side.

10 Claims, 4 Drawing Sheets

(56) References Cited

U.S. PATENT DOCUMENTS

| | | | |
|---|---|---|---|
| 2011/0203776 A1* | 8/2011 | McAlister | F03G 7/05 |
| | | | 165/104.26 |
| 2014/0165560 A1* | 6/2014 | Henry | F02M 26/15 |
| | | | 60/605.2 |
| 2014/0165570 A1 | 6/2014 | Herring | |
| 2014/0174706 A1 | 6/2014 | Yamada et al. | |

FOREIGN PATENT DOCUMENTS

| | | | |
|---|---|---|---|
| GB | 1516041 | 6/1978 | |
| WO | WO-0238938 A1 * | 5/2002 | F01D 9/065 |
| WO | 2004059696 | 7/2004 | |
| WO | 2014200597 | 12/2014 | |
| WO | 2015132250 | 9/2015 | |
| WO | 2016080364 | 5/2016 | |

OTHER PUBLICATIONS

EP Application No. 17193812.9 Office Action dated Jan. 28, 2019, 3 pages.
EP Application No. 17193812.9 Extended European Search Report dated Jan. 26, 2018, 10 pages.
EP Application No. 17193812.9 Office Action dated Nov. 5, 2019, 3 pages.

* cited by examiner

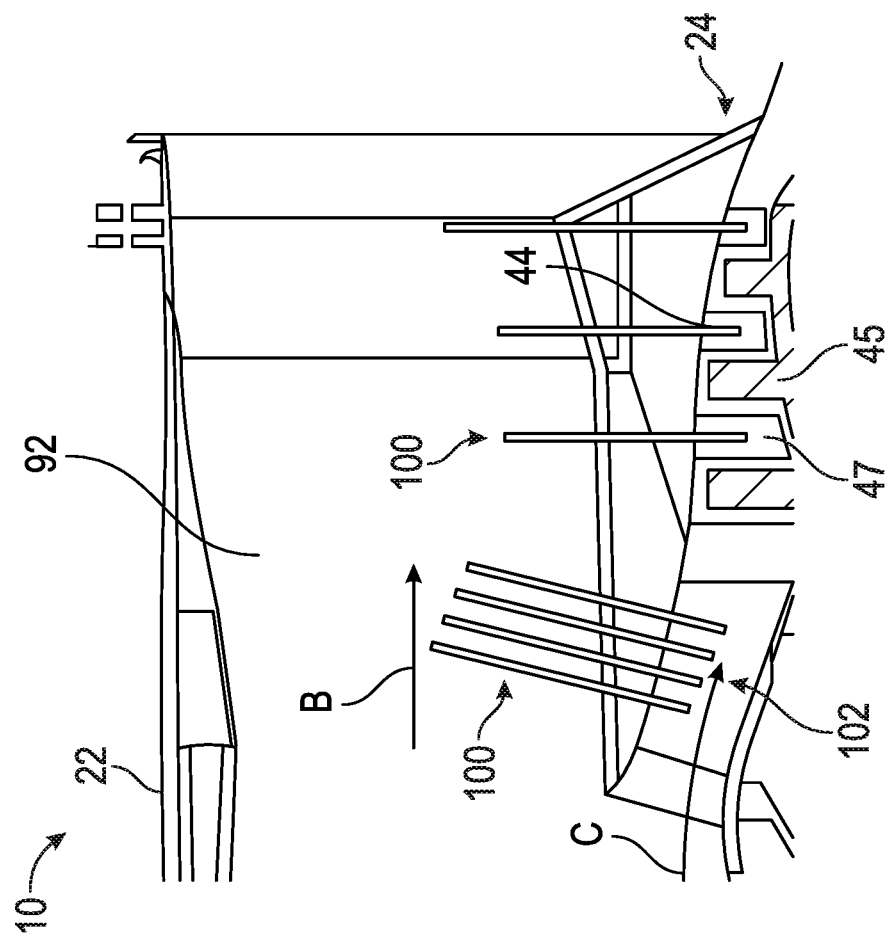

GAS TURBINE ENGINE WITH GRAPHENE HEAT PIPE

BACKGROUND

This disclosure relates to gas turbine engines, and more particularly to an apparatus, system and method for localized temperature reduction in gas turbine engines using graphene heat pipes.

As gas turbine engines are built with improved efficiency, higher temperatures are reached in the back end of the high compressor in proximity to the combustor. The higher temperatures can result in reduced component life based on currently used materials. The addition of cooling systems to reduce temperatures at the back end of the high compressor adds to overall system weight and cost. Cooling systems that use materials with lower thermal conductivity can require a substantial amount of surface area to remove heat from the compressor flow path.

Accordingly, it is desirable to provide a method and/or apparatus for improving thermal conductivity to provide compressor flow path cooling with a reduced surface area.

BRIEF DESCRIPTION

In an embodiment, a graphene heat pipe for a gas turbine engine includes a body of graphene. The body has a hot side to accept heat from the gas turbine engine, a cold side to reject heat from the body, and an adiabatic portion to flow heat within the body between the hot side and the cold side.

In addition to one or more of the features described above, or as an alternative to any of the foregoing embodiments, further embodiments may include where the body is at least partially coated with graphene.

In addition to one or more of the features described above, or as an alternative to any of the foregoing embodiments, further embodiments may include where the body is integrally formed of graphene.

In addition to one or more of the features described above, or as an alternative to any of the foregoing embodiments, further embodiments may include at least one end cap to establish a closed fluid flow environment within the graphene heat pipe.

In addition to one or more of the features described above, or as an alternative to any of the foregoing embodiments, further embodiments may include a wick structure within the body, where the wick structure divides a vapor flow channel from a liquid flow channel within the body.

In addition to one or more of the features described above, or as an alternative to any of the foregoing embodiments, further embodiments may include where the wick structure is one of a sintered wick, a mesh wick, a grooved wick or a combination thereof, and a working fluid of the graphene heat pipe is one of glycol, water, alcohol, refrigerant, or a mixture thereof.

In addition to one or more of the features described above, or as an alternative to any of the foregoing embodiments, further embodiments may include where the body is a wound coil.

In addition to one or more of the features described above, or as an alternative to any of the foregoing embodiments, further embodiments may include where the body is formed absent an interior phase change volume.

According to an embodiment, a gas turbine engine of an aircraft includes a fan section comprising a fan duct that establishes a fan flow path, a compressor section including a plurality of blades and vanes that establish a compressor flow path, and a graphene heat pipe. The graphene heat pipe is installed to flow heat from the compressor flow path to the fan flow path.

In addition to one or more of the features described above, or as an alternative to any of the foregoing embodiments, further embodiments may include where the graphene heat pipe includes a body of graphene having a hot side to accept heat from the compressor flow path, a cold side to reject heat from the body to the fan flow path, and an adiabatic portion to flow heat within the body between the hot side and the cold side.

In addition to one or more of the features described above, or as an alternative to any of the foregoing embodiments, further embodiments may include where the hot side of the body is installed within one of the vanes of the compressor section of the gas turbine engine.

According to an embodiment, a method for cooling a compressor flow path of a gas turbine engine includes providing a graphene heat pipe within the gas turbine engine and accepting heat at a hot side of the graphene heat pipe proximate to a compressor flow path of the gas turbine engine. The method further includes flowing heat from the hot side of the graphene heat pipe through an adiabatic portion of the graphene heat pipe to a cold side of the graphene heat pipe and rejecting heat from the cold side of the graphene heat pipe to a fan flow path of the gas turbine engine.

In addition to one or more of the features described above, or as an alternative to any of the foregoing embodiments, further embodiments may include where providing the graphene heat pipe further includes installing the graphene heat pipe within one of a plurality of vanes of a compressor section of the gas turbine engine.

In addition to one or more of the features described above, or as an alternative to any of the foregoing embodiments, further embodiments may include where the graphene heat pipe is a wound coil of graphene or a coiled substrate coated with graphene.

In addition to one or more of the features described above, or as an alternative to any of the foregoing embodiments, further embodiments may include installing a plurality of the graphene heat pipes at a plurality of axially and/or radially distributed locations within the gas turbine engine.

A technical effect of the apparatus, systems and methods is achieved by using one or more graphene heat pipes in a gas turbine engine as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 2 is a partial view of graphene heat pipe installation location examples in the gas turbine engine of FIG. 1 in accordance with an embodiment of the disclosure;

DETAILED DESCRIPTION

Various embodiments of the present disclosure are related to heat reduction within a gas turbine engine using one or more graphene heat pipes. One or more graphene heat pipes can be used to transfer heat from an engine core flow (also referred to as a compressor flow path) to a fan stream (also referred to as a fan flow path). By placing one or more graphene heat pipes in a front portion of the engine compressor section, intercooling of the gas turbine engine can be achieved with a reduced weight impact as compared to other intercooler designs. Depending upon the material composition ratios, a graphene heat pipe can have about ten times the thermal conductivity of a plain copper heat pipe. In some embodiments, the graphene heat pipe is formed as a graphene coating applied to a substrate, such as a copper substrate at least partially coated in graphene. In other embodiments, graphene can be infused within a substrate to improve structural properties of the graphene while substantially retaining the thermal conductivity properties of graphene. In other embodiments, a body of the heat pipe is entirely formed of graphene.

Figure 1:
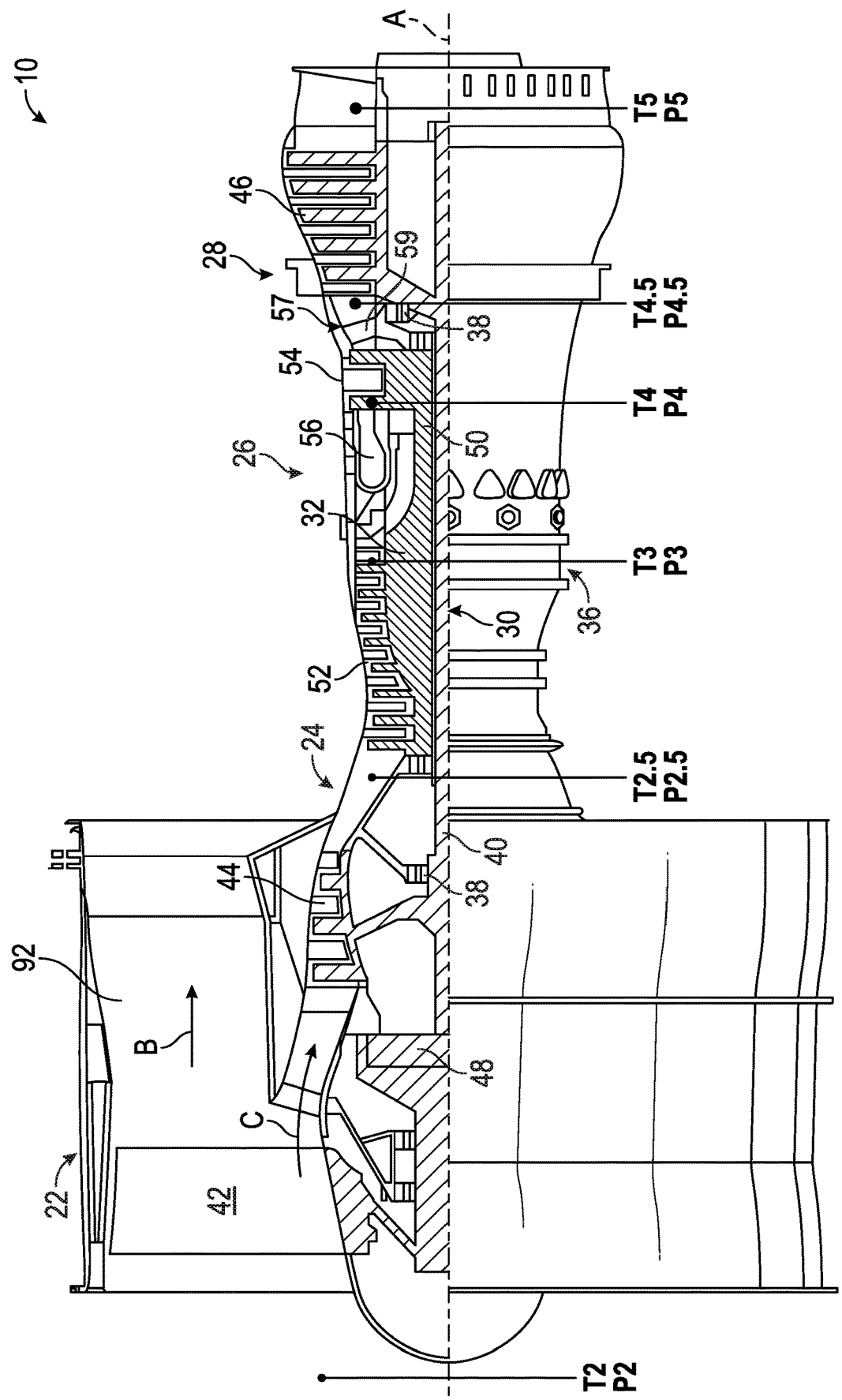
FIG. 1 is a cross-sectional view of a gas turbine engine.

FIG. 1 schematically illustrates a gas turbine engine 10 that can be used to power an aircraft, for example. The gas turbine engine 10 is disclosed herein as a multi-spool turbofan that generally incorporates a fan section 22, a compressor section 24, a combustor section 26 and a turbine section 28. The fan section 22 drives air along a fan flow path B (also referred to as bypass flow path B) established by fan duct 92, while the compressor section 24 drives air along a compressor flow path C (also referred to as core flow path C) for compression and communication into the combustor section 26 then expansion through the turbine section 28. Although depicted as a turbofan gas turbine engine in the disclosed non-limiting embodiment with two turbines and is sometimes referred to as a two spool engine, it should be understood that the concepts described herein are not limited to use with turbofans as the teachings may be applied to other types of turbine engines including three-spool architectures. For example, a three-spool architecture can include three spools that concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The engine 10 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30 in the example of FIG. 1. The high speed spool 32 includes an outer shaft 50 that interconnects a high pressure compressor 52 and high pressure turbine 54. In alternate embodiments, the geared architecture 48 is omitted.

A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

A number of stations for temperature and pressure measurement/computation are defined with respect to the gas turbine engine 10 according to conventional nomenclature. Station 2 is at an inlet of low pressure compressor 44 having a temperature T2 and a pressure P2. Station 2.5 is at an exit of the low pressure compressor 44 having a temperature T2.5 and a pressure P2.5. Station 3 is at an inlet of the combustor 56 having a temperature T3 and a pressure P3. Station 4 is at an exit of the combustor 56 having a temperature T4 and a pressure P4. Station 4.5 is at an exit of the high pressure turbine 54 having a temperature T4.5 and a pressure P4.5. Station 5 is at an exit of the low pressure turbine 46 having a temperature T5 and a pressure P5. Embodiments add one or more graphene heat pipes axially upstream of station 3 to reduce temperature T3 under nominal operating conditions.

FIG. 2 is a partial view of graphene heat pipe installation location examples in the gas turbine engine 10 of FIG. 1. The compressor section 24 includes a plurality of blades 45 and vanes 47 that establish the compressor flow path C. In embodiments, one or more graphene heat pipes 100 can be axially distributed at compressor inlet 102 and/or throughout the compressor section 24, particularly in the low pressure compressor 44. The graphene heat pipes 100 can also be radially distributed, for instance, with multiple graphene heat pipes 100 distributed proximate to or within vanes 47 of a same compressor stage. As an example, each of the graphene heat pipes 100 located within one of the vanes 47 may have a diameter of about 0.25 inches. Each of the graphene heat pipes 100 can be installed between the compressor section 24 and the fan section 22 to flow heat from the compressor flow path C to the fan flow path B.

Figure 3:
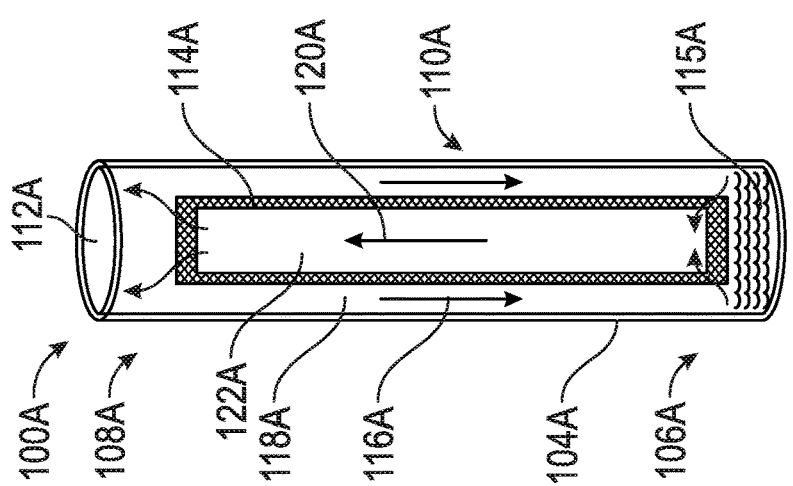
FIG. 3 depicts an example of a graphene heat pipe in accordance with an embodiment of the disclosure.

FIG. 3 depicts an example of a graphene heat pipe 100A as an embodiment of the graphene heat pipe 100 of FIG. 2. The graphene heat pipe 100A includes a body 104A of graphene, where the body 104A is at least partially coated with graphene, or the body 104A is integrally formed of graphene. For example, the body 104A can be a copper substrate that is spray coated or infused with graphene. The body 104A includes a hot side 106A that accepts heat from the gas turbine engine 10 of FIG. 1. The body 104A also includes a cold side 108A to reject heat from the body 104A. The body 104A further includes an adiabatic portion 110A to flow heat within the body 104A between the hot side 106A and the cold side 108A. The graphene heat pipe 100A can also include at least one end cap 112A to establish a closed fluid flow environment within an interior phase change volume of the graphene heat pipe 100A.

A two-phase working fluid 115A can be circulated within a tubular structure of the body 104A of the graphene heat pipe 100A during normal operation. The working fluid 115A can be, for example, one of glycol, water, alcohol, refrigerant, or a mixture thereof. A wick structure 114A can divide a vapor flow channel 122A from a liquid flow channel 118A within an interior phase change volume of the body 104A. The wick structure 114A within the body 104A can establish a liquid flow 116A of the working fluid 115A in the liquid flow channel 118A and a vapor flow 120A in the vapor flow channel 122A. The wick structure 114 can be one of a sintered wick, a mesh wick, a grooved wick or a combination thereof. The working fluid 115A is heated in the hot side 106A, changes phase from a liquid to a vapor, and rise as vapor flow 120A in the vapor flow channel 122A toward the cold side 108A. The vapor flow 120A cools in the cold side 108A and returns as liquid flow 116A in the liquid flow channel 118A. The phase change and flow process repeats within the graphene heat pipe 100A as heat is transferred from the compressor flow path C to the fan flow path B of FIG. 2.

Figure 4:
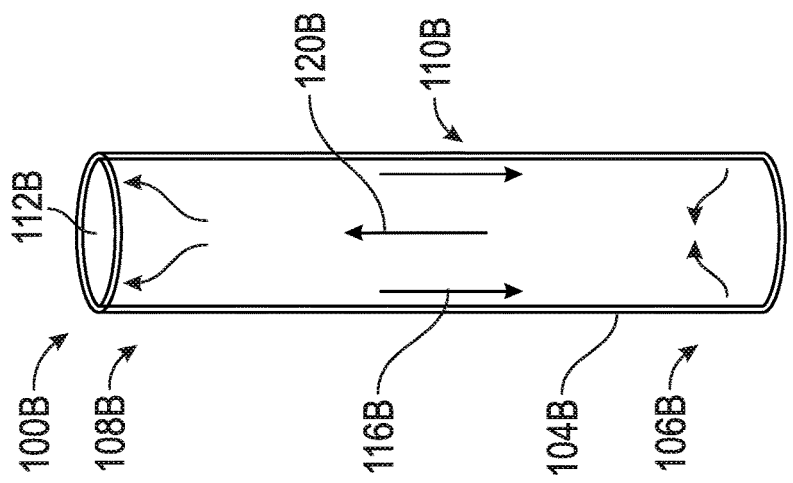
FIG. 4 depicts another example of a graphene heat pipe in accordance with another embodiment of the disclosure.

FIG. 4 depicts another example of a graphene heat pipe 100B as an embodiment of the graphene heat pipe 100 of FIG. 2. The graphene heat pipe 100B includes a body 104B of graphene, where the body 104B is at least partially coated with graphene, or the body 104B is integrally formed of graphene. For example, the body 104B can be a copper substrate that is spray coated or infused with graphene. The body 104B includes a hot side 106B that accepts heat from the gas turbine engine 10 of FIG. 1. The body 104B also includes a cold side 108B to reject heat from the body 104B. The body 104B further includes an adiabatic portion 110B to flow heat within the body 104B between the hot side 106B and the cold side 108B. The graphene heat pipe 100B can also include at least one end cap 112B to establish a closed fluid flow environment within an interior phase change volume of the graphene heat pipe 100B. In alternate embodiments, one or more ends of the body 104B directly contacts another surface, such as an interior surface of one of the vanes 47 of FIG. 2, and end cap 112B can be omitted. When a working fluid is a gas, such as air, there may not be a wick structure incorporated within the body 104B. A hotter flow 120B can transfer heat from the hot side 106B to the cold side 108B, and a cooler flow 116B can return from the cold side 108B to the hot side 106B.

Figure 5:
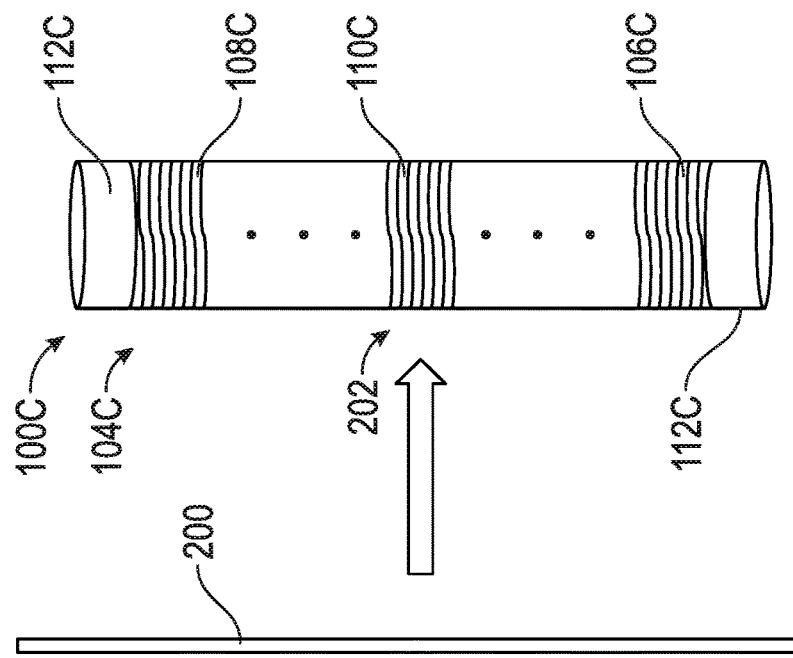
FIG. 5 depicts a further example of a graphene heat pipe in accordance with another embodiment of the disclosure.

FIG. 5 depicts a further example of a graphene heat pipe 100C as an embodiment of the graphene heat pipe 100 of FIG. 2. In the example of FIG. 5, a strip 200 is tightly wrapped into a wound coil 202 to form a body 104C. The strip 200 can be at least partially coated with graphene or infused with graphene prior to winding or after winding into the body 104C. Similar to the body 104B of FIG. 4, the body 104C can include an adiabatic portion 110C to flow heat within the body 104C between a hot side 106C and a cold side 108C. The graphene heat pipe 100C can also include at least one end cap 112C to establish a closed fluid flow environment within the graphene heat pipe 100C. In alternate embodiments, one or more ends of the body 104C directly contacts another surface, such as an interior surface of one of the vanes 47 of FIG. 2, and end cap 112C can be omitted. When a working fluid is a gas, such as air, there may not be a wick structure incorporated within the body 104C. In some embodiments, the body 104C is tightly wound into a substantially solid structure such that the body 104C is formed absent an interior phase change volume and no phase change occurs within the body 104C.

Figure 6:
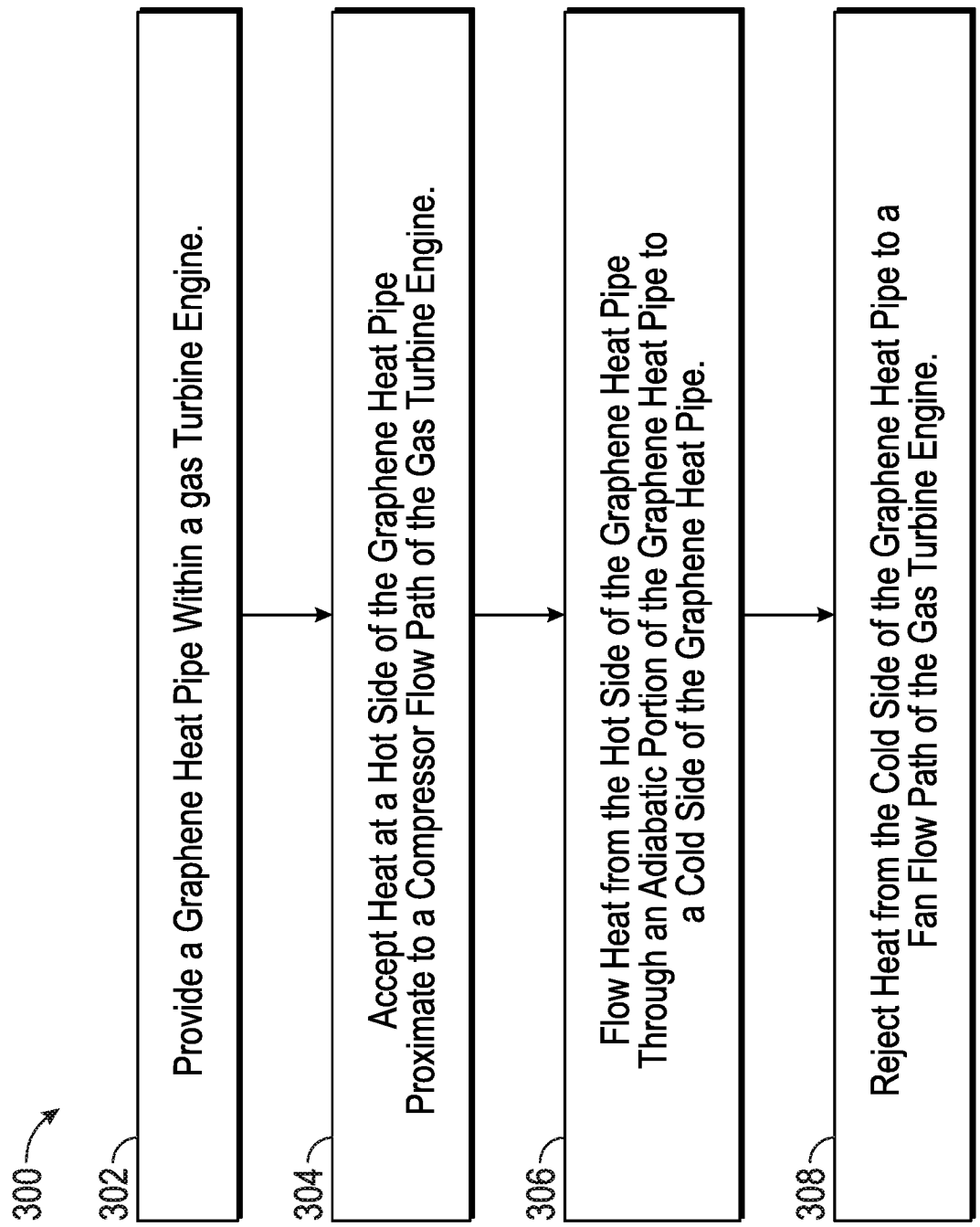
FIG. 6 is a flow chart illustrating a method in accordance with an embodiment of the disclosure.

FIG. 6 is a flow chart illustrating a method 300 for cooling a compressor flow path C of the gas turbine engine 10 in accordance with an embodiment. The method 300 of FIG. 6 is described in reference to FIGS. 1-5 and may be performed with an alternate order and include additional steps.

At block 302, a graphene heat pipe 100 is provided within the gas turbine engine 10. The graphene heat pipe 100 can be embodied as graphene heat pipe 100A, 100B, 100C, or in an alternate arrangement as understood by one of ordinary skill in the art. The graphene heat pipe 100A, 100B, 100C may be installed within one of a plurality of vanes 47 of a compressor section 24 of the gas turbine engine 10. A plurality of the graphene heat pipes 100A, 100B, 100C can be installed at a plurality of axially and/or radially distributed locations within the gas turbine engine 10, such as within a same stage or multiple stages of the compressor section 24.

At block 304, heat is accepted at a hot side 106A, 106B, 106C of the graphene heat pipe 100A, 100B, 100C proximate to compressor flow path C of the gas turbine engine 10. At block 306, heat flows from the hot side 106A, 106B, 106C of the graphene heat pipe 100A, 100B, 100C through an adiabatic portion 110A, 110B, 110C of the graphene heat pipe 100A, 100B, 100C to a cold side 108A, 108B, 108C of the graphene heat pipe 100A, 100B, 100C. At block 308, heat is rejected from cold side 108A, 108B, 108C of the graphene heat pipe 100A, 100B, 100C to fan flow path B of the gas turbine engine 10.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A graphene heat pipe for a gas turbine engine, the graphene heat pipe comprising:
    a body comprising a copper substrate coated with graphene, the body having a hot side to accept heat from the gas turbine engine, a cold side to reject heat from the body, and an adiabatic portion to flow heat within the body between the hot side and the cold side, wherein the graphene heat pipe is a strip wrapped into a wound coil, and the graphene heat pipe is formed as a solid structure such that the graphene heat pipe is formed absent an interior phase change volume and no phase change occurs within the graphene heat pipe.

2. A gas turbine engine of an aircraft, the gas turbine engine comprising:
    a fan section comprising a fan duct that establishes a fan flow path;
    a compressor section comprising a plurality of blades and vanes that establish a compressor flow path; and
    a graphene heat pipe installed to flow heat from the compressor flow path to the fan flow path, wherein the graphene heat pipe comprises a body comprising graphene, the body directly contacting an interior surface of a vane of the compressor section, the body having a hot side to accept heat from the compressor flow path, a cold side to reject heat from the body to the fan flow path, and an adiabatic portion to flow heat within the body between the hot side and the cold side, the graphene heat pipe is a strip wrapped into a wound coil, and the graphene heat pipe is formed as a solid structure such that graphene heat pipe is formed absent an interior phase change volume and no phase change occurs within the graphene heat pipe.

3. The gas turbine engine of claim 2, wherein the body is at least partially coated with graphene.

4. The gas turbine engine of claim 2, wherein the body is integrally formed of graphene.

5. A method for cooling a compressor flow path of a gas turbine engine, the method comprising:
  providing a graphene heat pipe within the gas turbine engine, wherein the graphene heat pipe comprises a body comprising graphene, the body directly contacting an interior surface of a vane of a compressor section of the gas turbine engine, the body having a hot side, a cold side, and an adiabatic portion to flow heat within the body between the hot side and the cold side, the graphene heat pipe is a strip wrapped into a wound coil and formed as a solid structure such that the graphene heat pipe is formed absent an interior phase change volume and no phase change occurs within the graphene heat pipe;
  accepting heat at the hot side of the graphene heat pipe proximate to the compressor flow path of the gas turbine engine;
  flowing heat from the hot side of the graphene heat pipe through the adiabatic portion of the graphene heat pipe to the cold side of the graphene heat pipe; and
  rejecting heat from the cold side of the graphene heat pipe to a fan flow path of the gas turbine engine.

6. The method as in claim 5, wherein the body is a copper substrate at least partially coated with graphene.

7. The method as in claim 5, further comprising installing a plurality of the graphene heat pipes at a plurality of axially distributed locations within the gas turbine engine.

8. The method as in claim 5, wherein the body is integrally formed of graphene.

9. The method as in claim 5, wherein the body is a copper substrate infused with graphene.

10. The method as in claim 5, further comprising installing a plurality of the graphene heat pipes at a plurality of radially distributed locations within the gas turbine engine.

* * * * *